(12) United States Patent
Kataoka et al.

(10) Patent No.: US 11,077,883 B2
(45) Date of Patent: Aug. 3, 2021

(54) FRONT VEHICLE-BODY STRUCTURE

(71) Applicant: Mazda Motor Corporation, Hiroshima (JP)

(72) Inventors: Yuki Kataoka, Hiroshima (JP); Shigeaki Watanabe, Hiroshima (JP); Takeshi Nakamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 174 days.

(21) Appl. No.: 16/570,601

(22) Filed: Sep. 13, 2019

(65) Prior Publication Data
US 2020/0094880 A1 Mar. 26, 2020

(30) Foreign Application Priority Data
Sep. 25, 2018 (JP) .............................. JP2018-179230

(51) Int. Cl.
*B62D 25/08* (2006.01)
*B62D 21/11* (2006.01)
*B62D 25/04* (2006.01)

(52) U.S. Cl.
CPC ............ *B62D 25/088* (2013.01); *B62D 21/11* (2013.01); *B62D 25/04* (2013.01)

(58) Field of Classification Search
CPC ...... B62D 25/08; B62D 25/088; B62D 21/11; B62D 25/04
See application file for complete search history.

(56) References Cited

U.S. PATENT DOCUMENTS 10,315,702 B2 * 6/2019 Nakamura ........... B62D 21/152
2017/0203794 A1 7/2017 Nakamura et al.

FOREIGN PATENT DOCUMENTS

JP 2017128228 A 7/2017
JP 6176227 B2 * 8/2017

* cited by examiner

*Primary Examiner* — Lori L Lyjak
(74) *Attorney, Agent, or Firm* — Alleman Hall Creasman & Tuttle LLP (57) ABSTRACT

The front vehicle-body structure includes: a hinge pillar extending vertically; a suspension housing spaced forward from the hinge pillar; an apron reinforcement that extends forward from an upper part of the hinge pillar, has a closed section perpendicular to a front-rear direction, and supports the suspension housing; a bracing reinforcement that extends rearward to be inclined downward so as to couple a lower part of the apron reinforcement and the hinge pillar in a bracing manner, and has a closed section perpendicular to a direction of the extension; and a first reinforcing member that is provided inside the closed section of the apron reinforcement and partitions the closed section in the front-rear direction. The bracing reinforcement includes, at a bottom thereof, a wheel well outer rear part extending rearward to be inclined downward, and the first reinforcing member is connected to the wheel well outer rear part.

8 Claims, 7 Drawing Sheets

FRONT VEHICLE-BODY STRUCTURE

BACKGROUND

The present invention relates to a front vehicle-body structure.

A known front vehicle-body structure includes a hinge pillar extending vertically, an apron reinforcement extending forward from an upper part of the hinge pillar, a suspension housing supported by the apron reinforcement, and a bracing reinforcement coupling the apron reinforcement and the hinge pillar in a bracing manner.

The suspension housing supports an upper end of a damper provided in a suspension for supporting front wheels. The damper is sometimes mounted to the suspension housing with its axis being inclined inward in a vehicle width direction toward an upper side in a front view of a vehicle. In this case, a component, which is directed inward in the vehicle width direction, of a vertical input load from the damper tends to deform the suspension housing so as to fall inclined downward toward an inner side in the vehicle width direction (hereinafter referred to as inward falling).

In particular, for example, in a rear-wheel-drive vehicle including a vertically placed engine, a suspension housing is sometimes spaced forward from a hinge pillar. In this case, an apron reinforcement is long in a front-rear direction, which prevents an increase in support rigidity of the suspension housing with the apron reinforcement, thereby more easily causing inward falling of the suspension housing.

To prevent inward falling of a suspension housing, for example, Japanese Patent Laid-Open No. 2017-128228 discloses a front vehicle-body structure including, inside an apron reinforcement having a closed section, a joint-like reinforcing member that partitions the section in a front-rear direction. The reinforcing member is provided inside the closed section to prevent crushing of the section of the apron reinforcement, thereby increasing the support rigidity of the suspension housing with the apron reinforcement and preventing inward falling of the suspension housing.

In the front vehicle-body structure described above, the reinforcing member increases the rigidity of the apron reinforcement itself, thereby preventing inward falling of the suspension housing. However, there is room for further preventing inward falling of the suspension housing in terms of further increasing support rigidity of the apron reinforcement with a bracing reinforcement.

The present invention has been made in view of the above described problems, and has an object to provide a front vehicle-body structure including an apron reinforcement supporting a suspension housing, and a bracing reinforcement that couples the apron reinforcement to a hinge pillar in a bracing manner, in which the support rigidity of the apron reinforcement is increased by the bracing reinforcement to prevent inward falling deformation of the suspension housing.

SUMMARY

To achieve the object, the invention of the present application is configured as described below.

A front vehicle-body structure according to a first aspect of the present application includes: a hinge pillar extending vertically; a suspension housing spaced forward from the hinge pillar; an apron reinforcement that extends forward from an upper part of the hinge pillar, has a closed section perpendicular to a front-rear direction, and supports the suspension housing; a bracing reinforcement that extends rearward to be inclined downward so as to couple the apron reinforcement and the hinge pillar in a bracing manner below the apron reinforcement, and has a closed section perpendicular to a direction of the extension; and a reinforcing member that is provided inside the closed section of the apron reinforcement and partitions the closed section in the front-rear direction, wherein the bracing reinforcement includes, at a bottom thereof, a bracing reinforcement bottom wall extending rearward to be inclined downward, and the reinforcing member is connected to the bracing reinforcement bottom wall.

In the front vehicle-body structure of a second aspect according to the first aspect, the apron reinforcement includes a front apron reinforcement that supports the suspension housing, and a rear apron reinforcement that couples a rear end of the front apron reinforcement and the hinge pillar, and the reinforcing member is provided at the rear end of the front apron reinforcement, and overlaps a front part of the rear apron reinforcement in the front-rear direction in a side view of a vehicle.

In the front vehicle-body structure of a third aspect according to the second aspect, the apron reinforcement includes, at an upper part, an apron reinforcement upper wall extending substantially horizontally, and the reinforcing member includes an upper flange that extends rearward from an upper end and is connected to the apron reinforcement upper wall, and a lower flange that extends rearward from a lower end and is connected to the bracing reinforcement bottom wall.

In the front vehicle-body structure of a fourth aspect according to the third aspect, the reinforcing member supports a rear end of the suspension housing.

In the front vehicle-body structure of a fifth aspect according to any one of the first to fourth aspects, the reinforcing member is a first reinforcing member, inside the closed section of the apron reinforcement, a second reinforcing member that partitions the closed section in the front-rear direction is further provided on a rear side of the first reinforcing member, the bracing reinforcement includes, at a top thereof, a bracing reinforcement top wall facing the bracing reinforcement bottom wall from an upper rear side, the apron reinforcement includes, at a bottom thereof, an apron reinforcement bottom wall extending substantially horizontally, and the bracing reinforcement top wall is vertically continuous with a lower end of the second reinforcing member via the apron reinforcement bottom wall.

With the above described configurations, the aspects of the present application provide the following advantageous effects.

First, with the front vehicle-body structure according to the first aspect, the reinforcing member is provided over the inside of the closed section of the apron reinforcement and the bracing reinforcement bottom wall. Specifically, a rigid portion of the bracing reinforcement extends into the closed section of the apron reinforcement without a break at a lower surface of the apron reinforcement.

The reinforcing member prevents crushing of the section of the apron reinforcement, thereby increasing the rigidity of the apron reinforcement itself and also increasing the support rigidity of the apron reinforcement with the bracing reinforcement. Thus, the apron reinforcement having the increased rigidity increases the support rigidity of the suspension housing, thereby effectively preventing inward falling of the suspension housing.

With the front vehicle-body structure according to the second aspect, the reinforcing member increases the rigidity of the rear end of the front apron reinforcement. Further, the rear end of the front apron reinforcement having the increased rigidity overlaps the rear apron reinforcement in the front-rear direction via the reinforcing member.

Thus, even if the reinforcing member is vertically provided over the bracing reinforcement and the apron reinforcement to divide the apron reinforcement into the front apron reinforcement and the rear apron reinforcement in the front-rear direction, a reduction in the rigidity of the apron reinforcement between the suspension housing and the hinge pillar can be prevented.

Thus, the rigidity of the bracing reinforcement with the reinforcing member can be increased, and also a reduction in the rigidity of the apron reinforcement can be prevented, thereby more effectively preventing inward falling of the suspension housing.

With the front vehicle-body structure according to the third aspect, on a front side of the hinge pillar, a portion of the apron reinforcement extending forward from the hinge pillar to the reinforcing member, the reinforcing member, and the bracing reinforcement constitute a high rigidity portion in the form of the number 7 in a side view. This further increases the support rigidity of the suspension housing with the apron reinforcement.

With the front vehicle-body structure according to the fourth aspect, in the high rigidity portion in the form of the number 7, the reinforcing member supports the rear end of the suspension housing, thereby further increasing the support rigidity of the suspension housing.

With the front vehicle-body structure according to the fifth aspect, the closed section of the bracing reinforcement vertically extends inside the closed section of the apron reinforcement via the first reinforcing member and also the second reinforcing member. As a result, the high rigidity portion formed by the closed section of the bracing reinforcement is configured to enter the closed section of the apron reinforcement, thereby further increasing the support rigidity of the apron reinforcement with the bracing reinforcement. This further increases the support rigidity of the apron reinforcement with the bracing reinforcement, and the apron reinforcement having the increased support rigidity further increases the support rigidity of the suspension housing, thereby further effectively preventing inward falling of the suspension housing.

Specifically, according to the aspects of the present invention, the front vehicle-body structure can increase the support rigidity of the apron reinforcement with the bracing reinforcement to prevent inward falling deformation of the suspension housing.

DETAILED DESCRIPTION

Now, with reference to the accompanying drawings, an embodiment of the present invention will be described. In the description below, a front vehicle-body structure of a vehicle will be described for one side (right side) in a vehicle width direction, but the same applies to the other side (left side). In the drawings, directions such as "front/rear", "inner/outer", and "up/down" refer to a front-rear direction, a vehicle width direction, and a vertical direction, respectively, of the vehicle unless otherwise described.

Overall Configuration of Front Vehicle-Body Structure

Figure 1:
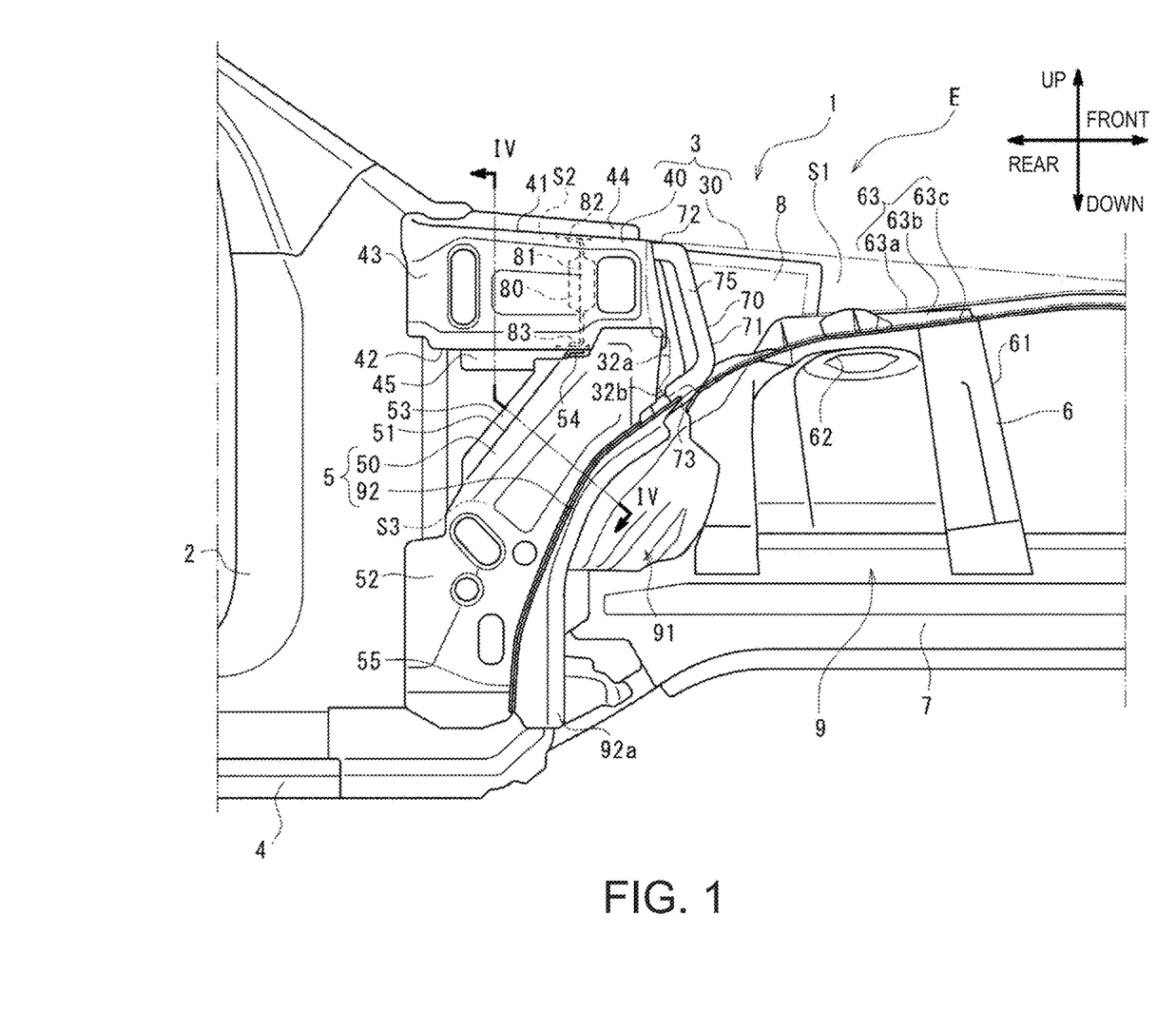
FIG. 1 is a right-side view of a front vehicle-body structure according to an embodiment of the present invention.
Figure 2:
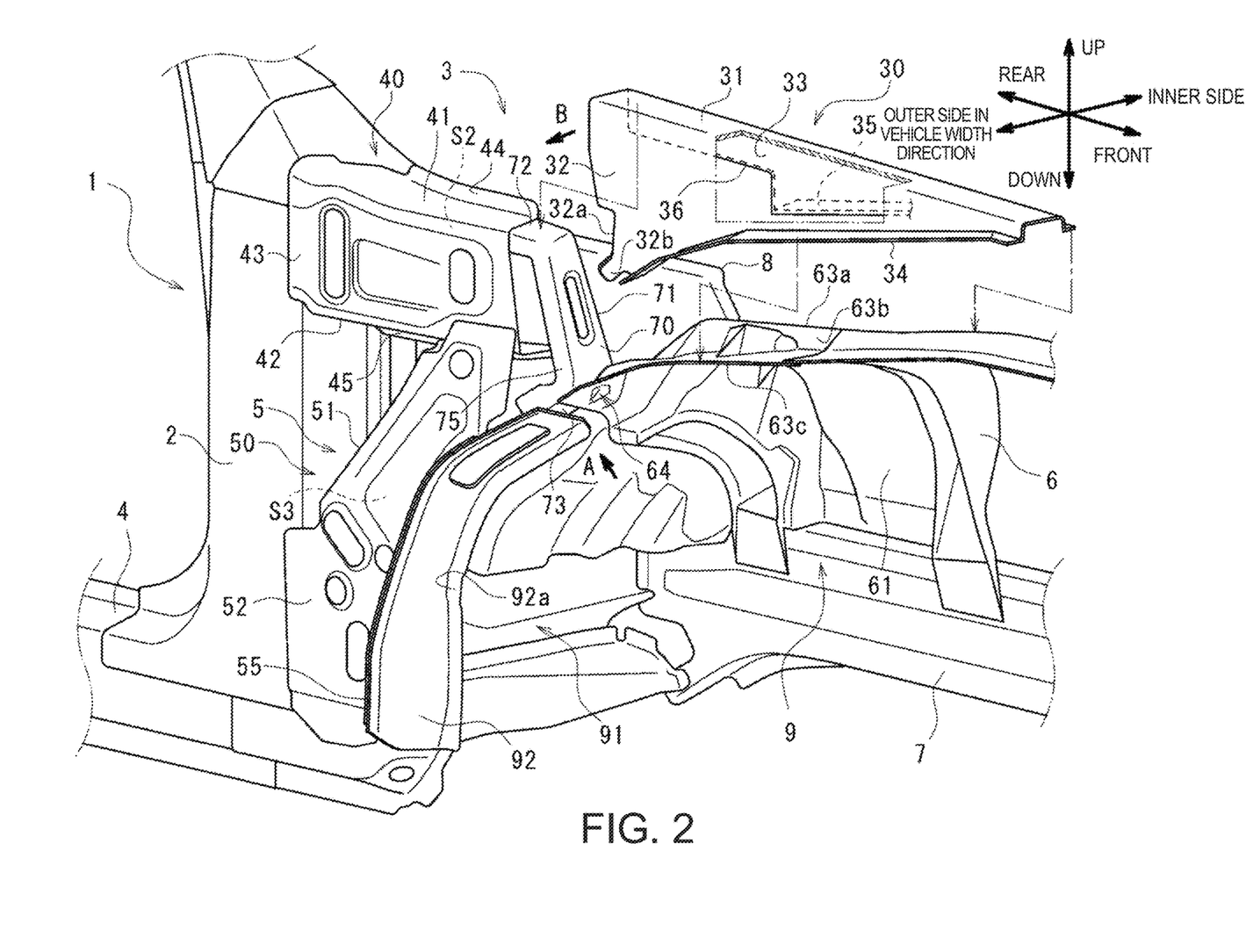
FIG. 2 is a perspective view of the front vehicle-body structure in FIG. 1.

As shown in FIGS. 1 and 2, a front vehicle-body structure 1 includes a hinge pillar 2 extending vertically in a front side part of a vehicle interior, an apron reinforcement 3 coupled to an upper part of the hinge pillar 2 and extending forward, a side sill 4 coupled to a lower part of the hinge pillar 2 and extending rearward, and a bracing reinforcement 5 coupling the apron reinforcement 3 to the hinge pillar 2 in a bracing manner and also to a front part of the side sill 4.

The hinge pillar 2 has a closed section extending vertically, and a front door (not shown) that is openably/closably pivoted thereon. The side sill 4 has a closed section extending in the front-rear direction, and a front end of the side sill 4 protrudes forward of a lower end of the hinge pillar 2.

The front vehicle-body structure 1 also includes a side frame 7 extending in the front-rear direction below the apron reinforcement 3 on an inner side in the vehicle width direction, and a suspension housing 6 spanning the apron reinforcement 3 and the side frame 7 in the vehicle width direction and supported. The suspension housing 6 is spaced forward from the hinge pillar 2, and houses a front suspension (not shown) therein (on a lower side).

A side panel 8 is provided between a rear part of the suspension housing 6 and the hinge pillar 2. The side panel 8 extends in the vertical and front-rear directions, and defines an outer end of an engine room E in the vehicle width direction.

Below the bracing reinforcement 5 and the suspension housing 6, a wheel well 9 housing a front wheel is formed. A substantially intermediate part of the wheel well 9 in the front-rear direction is constituted by the suspension housing 6. A rear part of the wheel well 9 includes a wheel well inner rear part 91 located on the inner side in the vehicle width direction and a wheel well outer rear part 92 located on the outer side in the vehicle width direction with the side panel 8 therebetween. These rear parts are joined to a lower front part of the side panel 8 from opposite sides in the vehicle width direction by spot welding. The wheel well outer rear part 92 extends rearward so as to curve downward.

Suspension Housing

The suspension housing 6 is a member made of an aluminum alloy and including a housing body 61, a suspension top 62 to which a damper (not shown) included in a front suspension is mounted from below, and a housing shoulder 63 formed one step lower at an outer end of an upper part in the vehicle width direction, integrally formed, for example, by aluminum die casting. The damper (not shown) is mounted to the suspension top with its axis being inclined inward in the vehicle width direction toward an upper side in a front view of the vehicle.

The housing shoulder 63 includes, on the outer side of the suspension top 62 in the vehicle width direction, an inner flange 63a extending substantially horizontally in the front-rear direction, a vertical wall 63b extending downward from an outer end of the inner flange 63a in the vehicle width direction, and an outer flange 63c extending from a lower end of the vertical wall 63b to the outer side in the vehicle width direction. The outer flange 63c extends forward so as to curve upward, and forms an end of the wheel well 9 on the outer side in the vehicle width direction.

Figure 3:
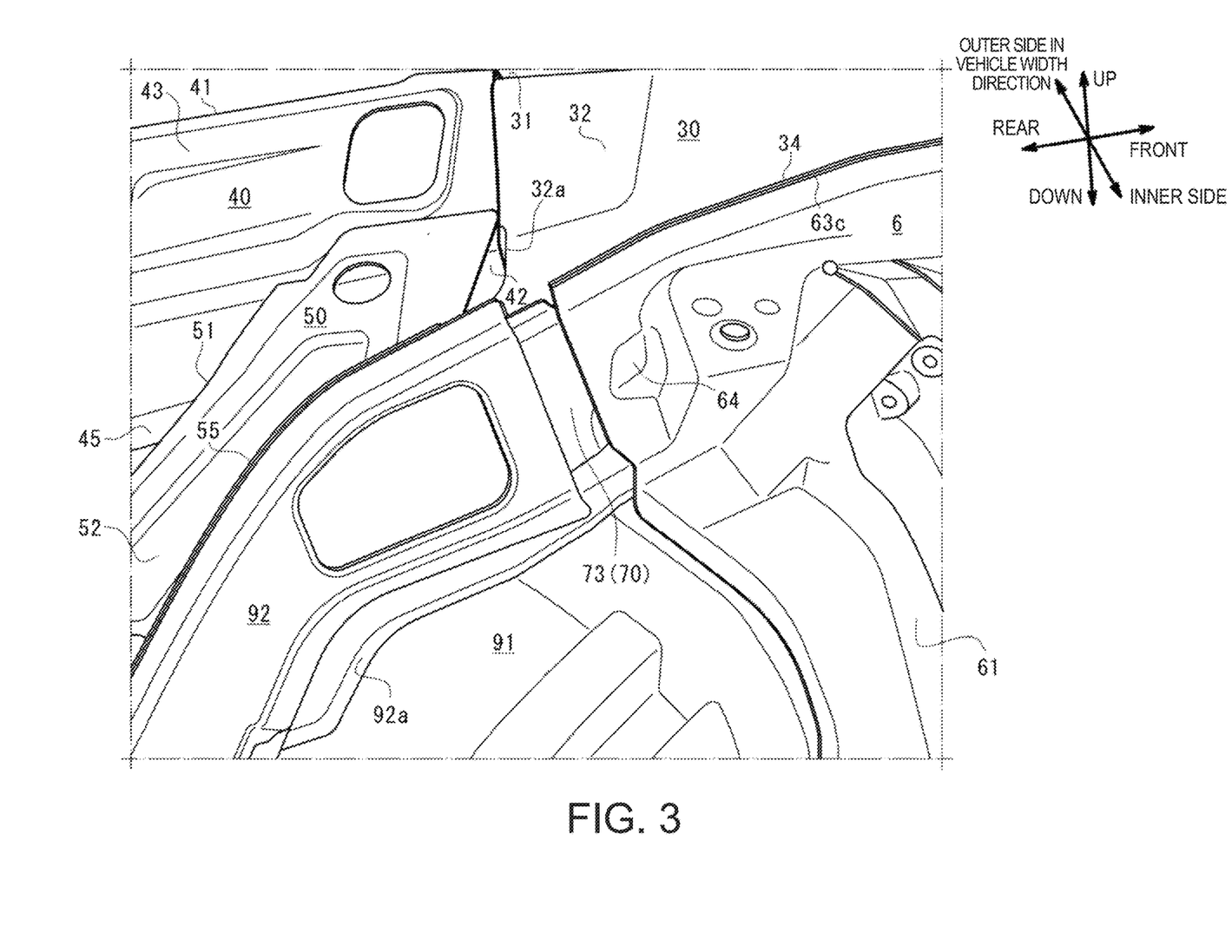
FIG. 3 is a perspective view taken in the direction of arrow A in FIG. 2.

FIG. 3 is an enlarged view, taken in the direction of an arrow A in FIG. 2, of a rear end upper part of the suspension housing 6 seen from below. As shown in FIG. 3, a base 64 expanding upward is formed at an upper end rear part of the housing body 61. A top surface of the base 64 has a planar shape inclined upward toward the inner side in the vehicle width direction and inclined outward in the vehicle width direction toward the front side.

Apron Reinforcement

As shown in FIGS. 1 and 2, the apron reinforcement 3 is divided in the front-rear direction into a front apron reinforcement 30 located on the front side and a rear apron reinforcement 40 located on the rear side. FIG. 1 shows the front apron reinforcement 30 in perspective by a two-dot chain line, and FIG. 2 shows the front apron reinforcement 30 removed upward from the front vehicle-body structure 1 in partially perspective.

The front apron reinforcement 30 extends along the housing shoulder 63 of the suspension housing 6 in the front-rear direction. The rear apron reinforcement 40 extends in the front-rear direction, and couples the front apron reinforcement 30 and the hinge pillar 2 in the front-rear direction.

As shown in FIG. 2, a basic section of the front apron reinforcement 30 perpendicular to the front-rear direction is a top-hat-shaped section opening downward. The front apron reinforcement 30 includes an upper surface 31 extending substantially horizontally in the front-rear direction at a top thereof, an outer surface 32 extending downward from an outer end of the upper surface 31 in the vehicle width direction, and an inner surface 33 extending downward from an inner end of the upper surface in the vehicle width direction. The upper surface 31 constitutes an apron reinforcement upper wall in the present invention.

At a lower end of the outer surface 32, an outer flange 34 extending outward in the vehicle width direction is formed. The inner surface 33 has a notch 36 cut in an inverted L shape in a rear lower part, and an inner flange 35 extending inward in the vehicle width direction is formed at a front lower end of the notch 36.

The front apron reinforcement 30 is joined, at the outer flange 34 and the inner flange 35, to the housing shoulder 63 of the suspension housing 6 from above, and joined, at the notch 36 on the rear side, to the side panel 8 from the outer side in the vehicle width direction.

Specifically, the front apron reinforcement 30 is joined, at the outer flange 34, to the outer flange 63c of the housing shoulder 63 from above, joined, at the inner flange 35, to the inner flange 63a of the housing shoulder 63 from above, and joined, at the notch 36, to a front part of the side panel 8 from the inner side in the vehicle width direction. Thus, the front apron reinforcement 30 together with the suspension housing 6 and the side panel 8 constitutes a rectangular closed section S1 (see FIG. 1) extending in the front-rear direction.

In the outer surface 32 of the front apron reinforcement 30, a notch 32a cut rearward in a squared U-shape is formed in a part of a rear edge closer to a lower side but except a lower end. In other words, the lower end of the rear edge of the outer surface 32 of the front apron reinforcement 30 is not cut, but forms a protrusion 32b protruding rearward of the notch 32a.

A first reinforcing member 70 is provided at a rear end of the front apron reinforcement 30. The first reinforcing member 70 partitions the closed section S1 in the front-rear direction, thereby preventing crushing of the section in the vertical and vehicle width directions.

The suspension housing 6 is a member made of an aluminum alloy, while other members joined to the suspension housing 6 are made of steel plates. Thus, these members are joined by riveting (for example, self-pierce riveting (SPR)). The members other than the suspension housing 6 are formed by pressing steel plates, and the members made of steel plates are joined by spot welding.

Figure 4:
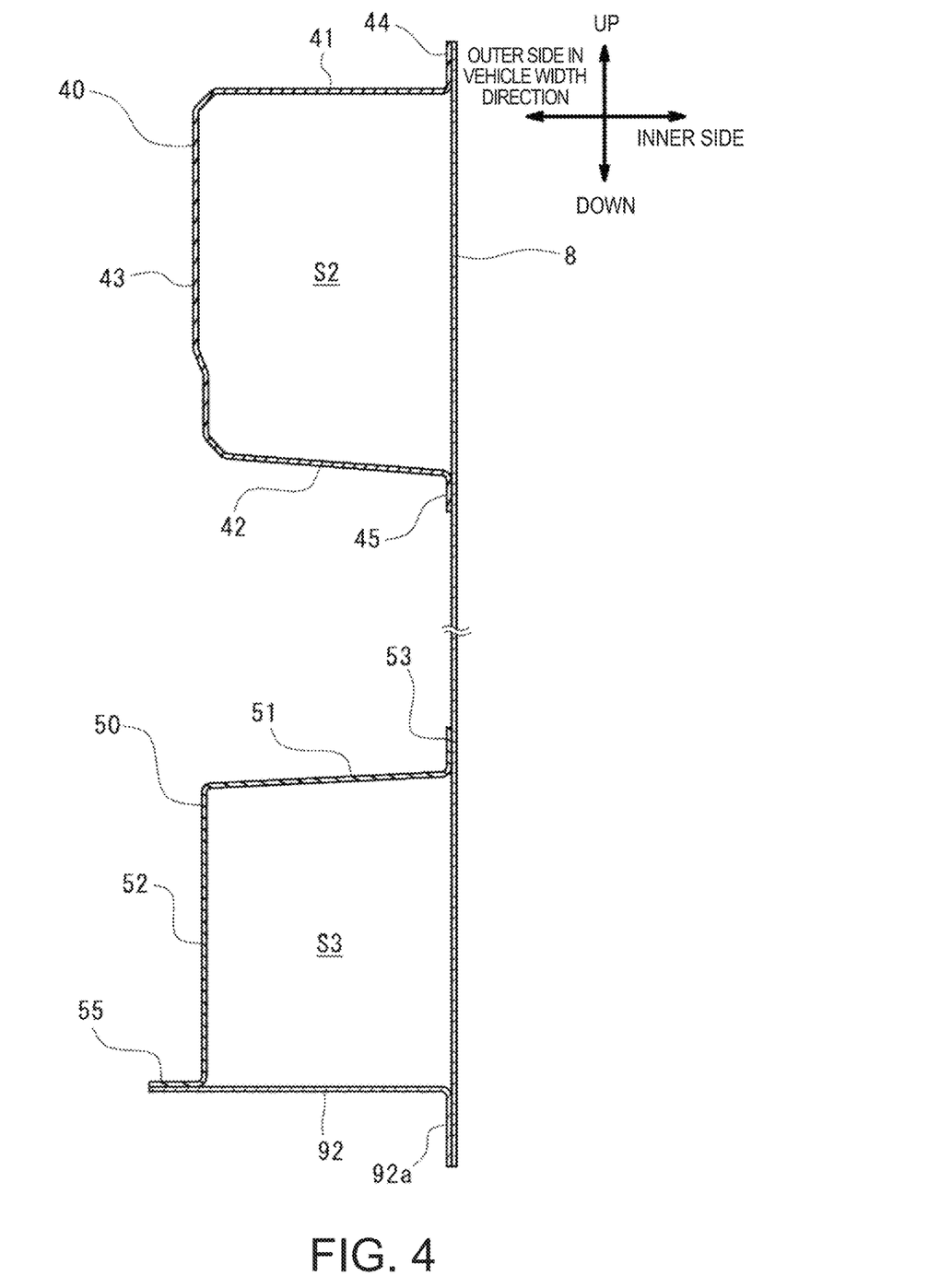
FIG. 4 is a sectional view taken along the line IV-IV in FIG. 1.

As shown in FIG. 4, a section of the rear apron reinforcement 40 perpendicular to the front-rear direction is a top-hat-shaped section opening inward in the vehicle width direction. The rear apron reinforcement 40 includes a pair of upper surface 41 and lower surface 42 extending substantially horizontally in the front-rear direction, and an outer surface 43 vertically connecting outer ends of the upper surface 41 and the lower surface 42 in the vehicle width direction. The upper surface 41 has an upper flange 44 extending upward from an inner end in the vehicle width direction. The lower surface 42 has a lower flange 45 extending downward from an inner end in the vehicle width direction. The lower surface 42 constitutes an apron reinforcement bottom wall in the present invention.

As shown in FIG. 3, the rear apron reinforcement 40 is joined to the rear end of the front apron reinforcement 30 from outside so as to overlap the rear end in the front-rear direction. Specifically, the rear apron reinforcement 40 is joined, at a front end of the upper surface 41, to a rear end of the upper surface 31 of the front apron reinforcement 30 from above by spot welding, and joined at a front end of the outer surface 43, to a rear end of the outer surface 32 of the front apron reinforcement 30 from the outer side in the vehicle width direction by spot welding.

The outer surface 32 of the front apron reinforcement 30 is vertically longer than the outer surface 43 of the rear apron reinforcement 40, and the lower surface 42 of the rear apron reinforcement 40 is located in the notch 32a. Thus, the outer surface 43 of the rear apron reinforcement 40 is located on the outer side in the vehicle width direction of the outer surface 32 of the front apron reinforcement 30, and also interference between the outer surface 32 of the front apron reinforcement 30 and the lower surface 42 of the rear apron reinforcement 40 is avoided.

As shown in FIG. 4, the rear apron reinforcement 40 is joined, at the pair of upper flange 44 and lower flange 45, to the side panel 8 from the outer side in the vehicle width direction by spot welding. Thus, the rear apron reinforcement 40 together with the side panel 8 constitutes a rectangular closed section S2 extending in the front-rear direction, and the closed section S2 overlaps and is continuous with the closed section S1 of the front apron reinforcement 30 in the front-rear direction.

As shown in FIG. 1, a second reinforcing member 80 is provided in the middle of the rear apron reinforcement 40 in the front-rear direction. The second reinforcing member 80 partitions the closed section S2 in the front-rear direction, thereby preventing crushing of the section in the vertical and vehicle width directions.

Bracing Reinforcement

As shown in FIGS. 1 and 2, the bracing reinforcement 5 includes the wheel well outer rear part 92 and a bracing member 50. The bracing member 50 extends rearward to be inclined downward. As shown in FIG. 4, the bracing member 50 has an L-shaped section and includes a rear surface 51 facing the wheel well outer rear part 92 from an upper rear side, having a width in the vehicle width direction, and extending rearward to be inclined downward, and an outer surface 52 extending forward from an outer end of the rear surface 51 in the vehicle width direction to be inclined downward. The rear surface 51 constitutes a bracing reinforcement top wall in the present invention.

The rear surface 51 includes a rear flange 53 extending rearward from an inner end in the vehicle width direction to be inclined upward, and an upper flange 54 extending forward from an upper end. The outer surface 52 has a front flange 55 extending outward in the vehicle width direction from a front edge extending to be inclined forward and upward and along the wheel well outer rear part 92.

The bracing member 50 is joined, at the rear flange 53, to the side panel 8 from the inner side in the vehicle width direction, and joined, at the front flange 55, to the outer end of the wheel well outer rear part 92 in the vehicle width direction from the rear side.

The upper flange 54 of the bracing member 50 is joined to the lower surface 42 of the rear apron reinforcement 40 from below by spot welding. The outer surface 52 of the bracing member 50 is joined, at an upper end, to a front lower part of the outer surface 43 of the rear apron reinforcement 40 from the outer side in the vehicle width direction by spot welding, and joined, at a rear end lower part, to a front end lower part of the hinge pillar 2 and a front end upper part of the side sill 4 from the outer side in the vehicle width direction by spot welding.

As shown in FIGS. 1 and 4, the wheel well outer rear part 92 is spaced rearward from the suspension housing 6, extends rearward so as to curve downward along an extending direction of the outer flange 63c of the suspension housing 6, and constitutes a bracing reinforcement bottom wall in the present invention. The wheel well outer rear part 92 has, at an inner end in the vehicle width direction, a flange 92a extending forward or forward and downward. The wheel well outer rear part 92 is joined, at the flange 92a, to the side panel 8 from the outer side in the vehicle width direction by spot welding.

Thus, in the bracing reinforcement 5, the bracing member 50, the wheel well outer rear part 92, and the side panel 8 form a closed section S3 extending rearward to be inclined downward.

First Reinforcing Member

Figure 5:
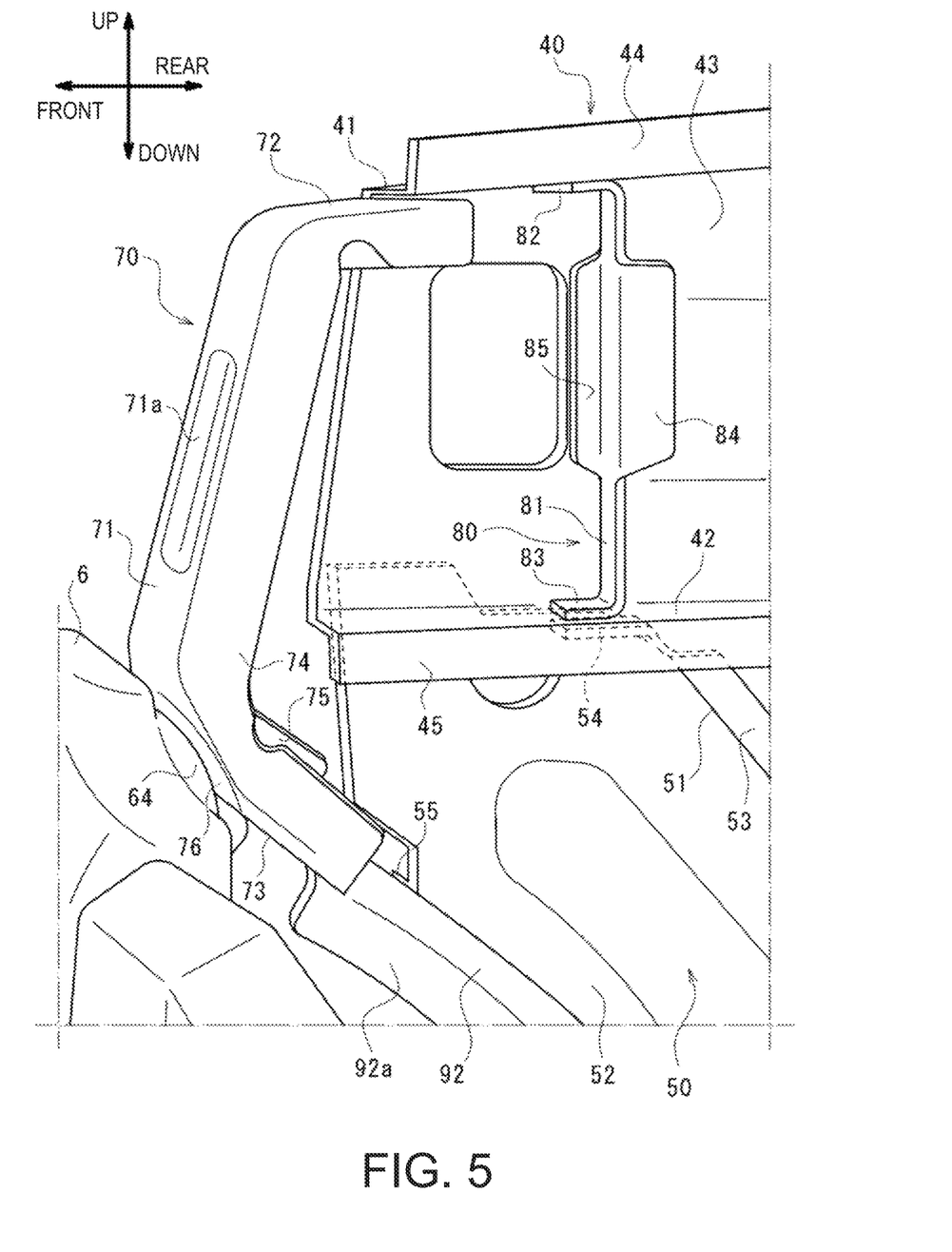
FIG. 5 is a perspective view taken in the direction of arrow B in FIG. 2.

FIG. 5 is an enlarged view, taken in the direction of an arrow B in FIG. 2, of a first reinforcing member 70 and therearound seen from the inner side in the vehicle width direction. The side panel 8 and the front apron reinforcement 30 are not shown. As shown in FIG. 5, the first reinforcing member 70 has a squared U-shape opening rearward in a side view of the vehicle, and includes a front surface 71 facing in the front-rear direction, an upper surface 72 extending rearward from an upper end of the front surface 71, and a lower surface 73 extending rearward from a lower end of the front surface 71 to be inclined downward.

The first reinforcing member 70 further includes an inner flange 74 extending rearward or vertically from an inner end in the vehicle width direction into the squared U-shaped section, and an outer flange 75 extending rearward or vertically from an outer end in the vehicle width direction into the squared U-shaped section.

Figure 6:
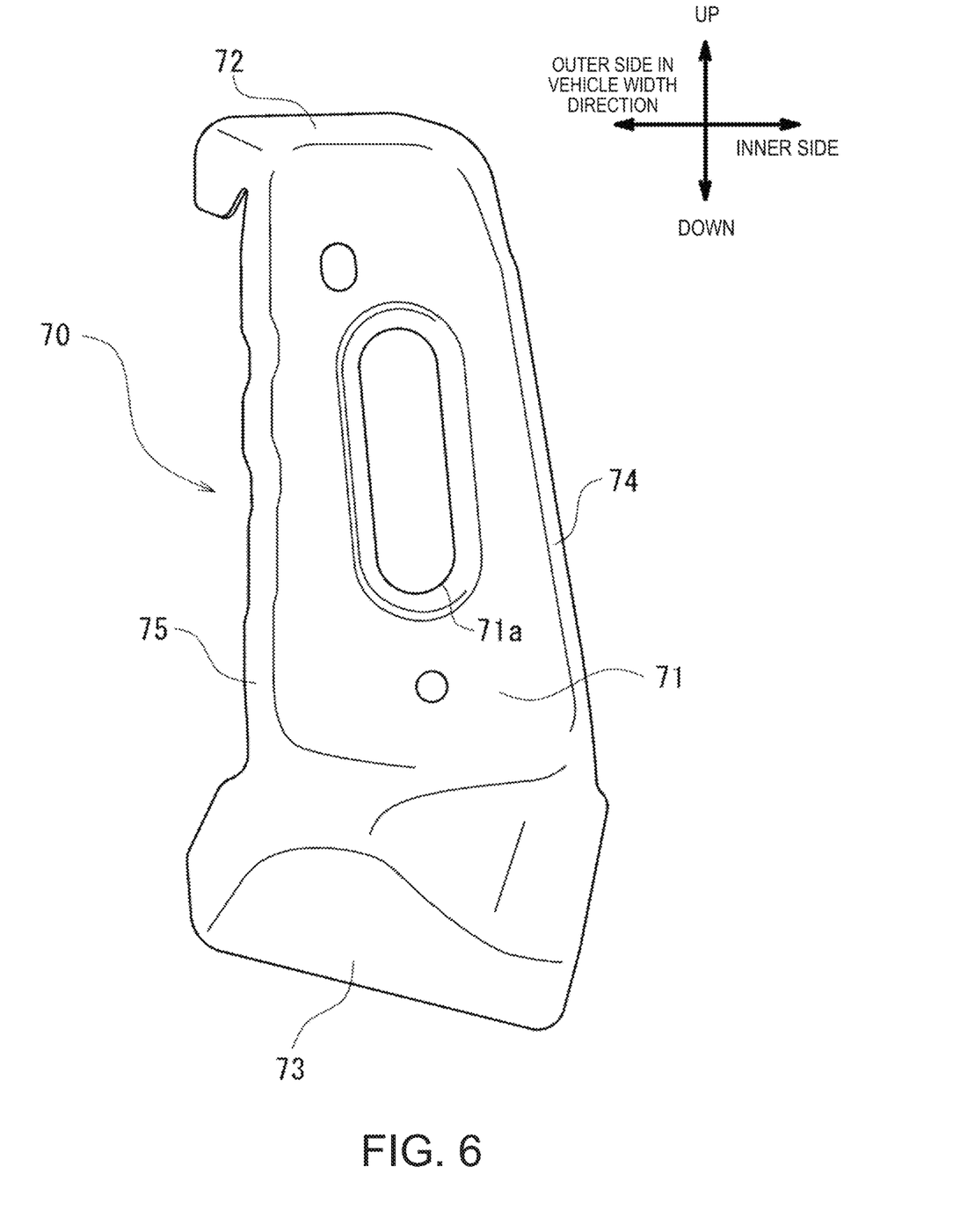
FIG. 6 is a front view of a first reinforcing member.

As shown in FIG. 6, the first reinforcing member 70 further includes a recess 76 chamfered rearward in a part of a bend between the front surface 71 and the lower surface 73 closer to the inner side in the vehicle width direction. The recess 76 has a planar shape inclined upward toward the inner side in the vehicle width direction, and inclined outward in the vehicle width direction toward the outer side.

The front surface 71 has an opening 71a extending therethrough in the front-rear direction. The opening 71a has a vertically long elliptical shape, and an edge of the opening is cut and raised rearward like burring. This increases rigidity of the front surface 71.

As shown in FIGS. 1 and 2, the first reinforcing member 70 is joined, at the upper surface 72, to the rear end of the upper surface 31 of the front apron reinforcement 30 from below by spot welding, joined, at the outer flange 75, to the rear end of the outer surface 32 of the front apron reinforcement 30 from the inner side in the vehicle width direction by spot welding, and joined, at the inner flange 74, to the side panel 8 from the outer side in the vehicle width direction by spot welding.

A lower end of the outer flange 75 of the first reinforcing member 70 is joined to the protrusion 32b formed at the lower end in the rear edge of the outer surface 32 of the front apron reinforcement 30 by spot welding.

As shown in FIG. 5, in the side view of the vehicle, the upper surface 72 and the lower surface 73 of the first reinforcing member 70 overlap a front part of the rear apron reinforcement 40 in the front-rear direction.

As shown in FIG. 3, the first reinforcing member 70 is joined, at a rear end of the lower surface 73, to an upper end of the wheel well outer rear part 92 from above by spot welding. Specifically, the lower surface 73 of the first reinforcing member 70 forms an outer end of the wheel well 9 between the suspension housing 6 and the wheel well outer rear part 92.

As shown in FIG. 1, the upper surface 31 of the front apron reinforcement 30 and the wheel well outer rear part 92 are vertically coupled via the first reinforcing member 70. Thus, the rear part of the front apron reinforcement 30, the rear apron reinforcement 40, the first reinforcing member 70, and the bracing reinforcement 5 constitute a high rigidity portion in the form of the number 7 in the side view of the vehicle.

Further, as shown in FIG. 5, the first reinforcing member 70 is joined, at the recess 76, to the base 64 of the suspension housing 6 by riveting. As described above, the recess 76 and the base 64 are inclined upward toward the inner side in the vehicle width direction, and thus the suspension housing 6 is joined to the recess 76 in a direction perpendicular to the inclination, that is, in a joining direction inclined downward toward the inner side in the vehicle width direction.

Thus, the suspension housing is joined to and supported by the first reinforcing member 70 having a higher rigidity in the high rigidity portion in the form of the number 7. Further, the recess 76 is chamfered in the bend of the first reinforcing member 70 and thus has a higher rigidity. To the recess 76, the suspension housing 6 is joined substantially along an inward falling direction of the suspension housing (that is, the direction inclined downward toward the inner side in the vehicle width direction). This effectively prevents inward falling of the suspension housing 6.

Second Reinforcing Member

As shown in FIG. 5, the second reinforcing member 80 is located on a rear side of the first reinforcing member 70, and is a joint-like member including a partition wall 81 that partitions the inside of the closed section S2 of the rear apron reinforcement 40 in the front-rear direction, an upper flange 82 and a lower flange 83 extending forward from an upper end and a lower end, respectively, of the partition wall 81, an inner flange 84 extending rearward from an inner end of the partition wall 81 in the vehicle width direction, and an outer flange 85 extending forward from an outer end of the partition wall 81 in the vehicle width direction.

The second reinforcing member 80 is joined, at the upper flange 82, to the upper surface 41 of the rear apron reinforcement 40 from below by spot welding, joined, at the lower flange 83, to the lower surface 42 of the rear apron reinforcement 40 from above by spot welding, joined, at the inner flange 84, to the side panel 8 from the outer side in the vehicle width direction by spot welding, and joined, at the outer flange 85, to the outer surface 43 of the rear apron reinforcement 40 from the inner side in the vehicle width direction by spot welding.

The second reinforcing member 80 is located generally correspondingly to an upper end of the bracing member 50 with the lower surface 42 of the rear apron reinforcement 40 therebetween. Specifically, in the second reinforcing member 80, the lower flange 83 is vertically continuous with the upper flange 54 of the bracing member 50 with the lower surface 42 of the rear apron reinforcement 40 therebetween for three-piece joining.

Thus, as shown in FIG. 1, the closed section S3 of the bracing reinforcement 5 enters the closed section S1 of the front apron reinforcement 30 and the closed section S2 of the rear apron reinforcement from below via the first reinforcing member 70 and the second reinforcing member 80.

The front vehicle-body structure 1 according to the embodiment provides the following effects.

(1) The first reinforcing member 70 is provided over the inside of the closed section S1 of the front apron reinforcement 30 and the wheel well outer rear part 92 located at the bottom of the bracing reinforcement 5. Specifically, a rigid portion of the bracing reinforcement 5 extends into the closed section S1 of the front apron reinforcement 30 without a break at the lower surface 42 of the rear apron reinforcement 40.

The first reinforcing member 70 prevents crushing of the section of the apron reinforcement 3, thereby increasing the rigidity of the apron reinforcement 3 itself and also increasing the support rigidity of the apron reinforcement 3 with the bracing reinforcement 5. Thus, the apron reinforcement 3 having the increased support rigidity increases the support rigidity of the suspension housing 6, thereby effectively preventing inward falling of the suspension housing 6.

(2) The first reinforcing member 70 increases the rigidity of the rear end of the front apron reinforcement 30. Further, the rear end of the front apron reinforcement 30 having the increased rigidity overlaps the rear apron reinforcement 40 in the front-rear direction via the first reinforcing member 70.

Thus, even if the first reinforcing member 70 is vertically provided over the bracing reinforcement 5 and the apron reinforcement 3 to divide the apron reinforcement 3 into the front apron reinforcement 30 and the rear apron reinforcement 40 in the front-rear direction, a reduction in the rigidity of the apron reinforcement 3 between the suspension housing 6 and the hinge pillar 2 can be prevented.

Thus, rigidity of the bracing reinforcement 5 with the first reinforcing member 70 can be increased, and also a reduction in the rigidity of the apron reinforcement 3 can be prevented, thereby more effectively preventing inward falling of the suspension housing 6.

(3) On the front side of the hinge pillar 2, the rear apron reinforcement 40 of the apron reinforcement 3 extending forward from the hinge pillar 2 to the reinforcing member, the first reinforcing member 70, and the bracing reinforcement 5 constitute a high rigidity portion in the form of the number 7 in a side view. This further increases the support rigidity of the suspension housing 6 with the apron reinforcement 3.

(4) In the high rigidity portion in the form of the number 7, the first reinforcing member 70 supports the rear end of the suspension housing 6, thereby further increasing the support rigidity of the suspension housing 6.

(5) The closed section S3 of the bracing reinforcement 5 vertically extends inside the closed sections S1, S2 of the apron reinforcement 3 via the first reinforcing member 70 and also the second reinforcing member 80. As a result, the high rigidity portion formed by the closed section S3 of the bracing reinforcement 5 is configured to enter the closed sections S1, S2 of the apron reinforcement 3, thereby further increasing the support rigidity of the apron reinforcement 3 with the bracing reinforcement 5. This further increases the support rigidity of the apron reinforcement 3 with the bracing reinforcement 5, and the apron reinforcement 3 having the increased support rigidity further increases the support rigidity of the suspension housing 6, thereby further effectively preventing inward falling of the suspension housing 6.

In the embodiment, the first reinforcing member 70 is joined, at the upper surface 72, to the upper surface 31 of the front apron reinforcement 30 from below. In addition, the front part of the upper surface 41 of the rear apron reinforcement 40 may be abutted to the upper surface 31 of the front apron reinforcement 30 from above for three-piece joining. This further increases the rigidity of the apron reinforcement 3.

Figure 7:
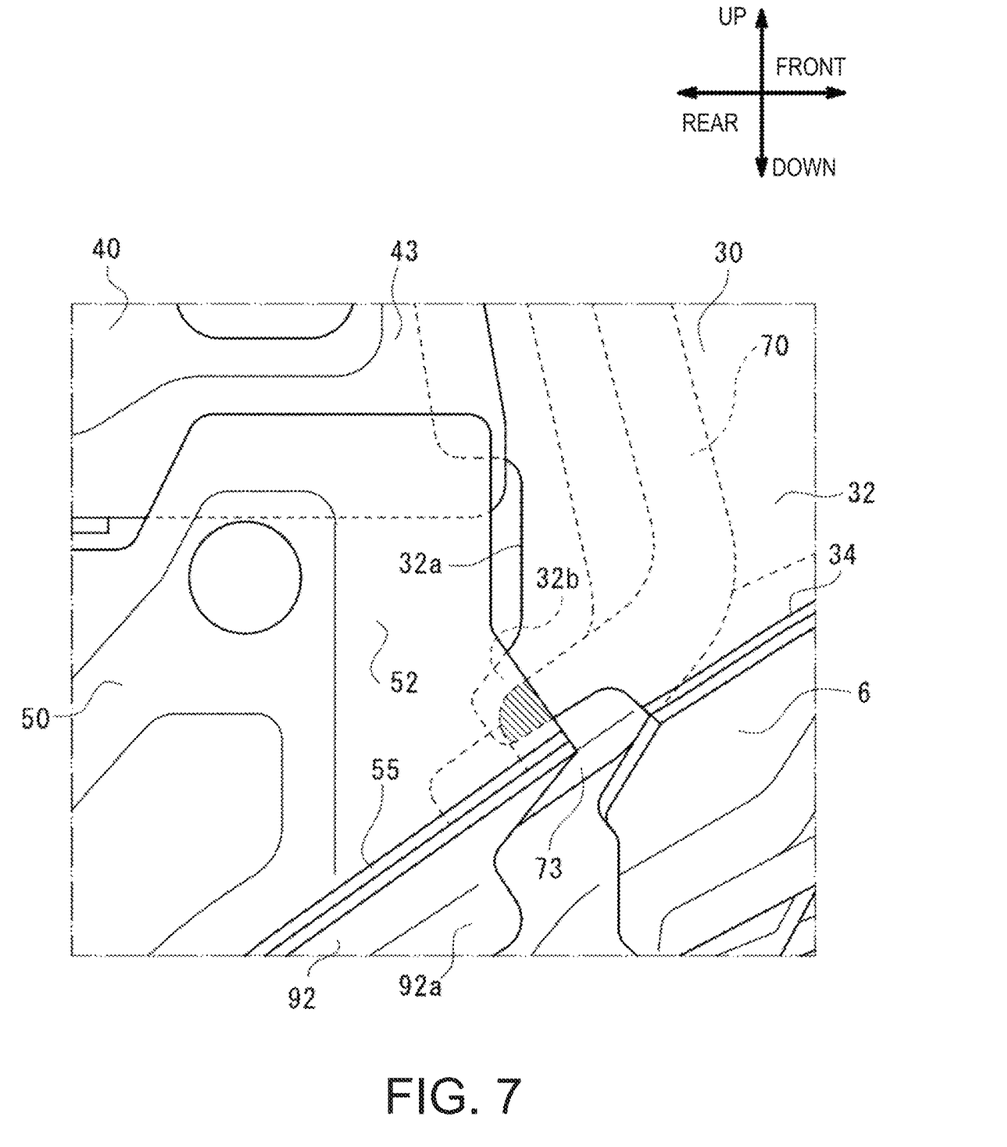
FIG. 7 is a side view of essential portions of a front vehicle-body structure according to a variant.

Further, as shown in FIG. 7, an upper part of the outer surface 52 of the bracing member 50 may be extended forward and thus joined to the protrusion 32b formed in the outer surface 32 of the front apron reinforcement 30 from the outer side in the vehicle width direction. In this case, as hatched in FIG. 7, the upper part of the outer surface 52 and the protrusion 32b may be further joined to the outer flange 75 of the first reinforcing member 70 for three-piece joining. This further increases the support rigidity of the apron reinforcement 3 with the bracing reinforcement 5.

As described above, with the front vehicle-body structure according to the present invention, increasing the support rigidity of the apron reinforcement with the bracing reinforcement can prevent inward falling deformation of the suspension housing. Thus, the front vehicle-body structure can be favorably used in this type of manufacturing technology field.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:
1. A front vehicle-body structure comprising:
a hinge pillar extending vertically;
a suspension housing spaced forward from the hinge pillar;
an apron reinforcement that extends forward from an upper part of the hinge pillar, has a closed section perpendicular to a front-rear direction, and supports the suspension housing;
a bracing reinforcement that extends rearward to be inclined downward so as to couple the apron reinforcement and the hinge pillar in a bracing manner below the apron reinforcement, and has a closed section perpendicular to a direction of extension; and
a reinforcing member that is provided inside the closed section of the apron reinforcement and partitions the closed section in the front-rear direction, wherein the bracing reinforcement includes, at a bottom thereof, a bracing reinforcement bottom wall extending rearward to be inclined downward, and the reinforcing member is connected to the bracing reinforcement bottom wall.

2. The front vehicle-body structure according to claim 1, wherein the apron reinforcement includes a front apron reinforcement that supports the suspension housing, and a rear apron reinforcement that couples a rear end of the front apron reinforcement and the hinge pillar, and the reinforcing member is provided at the rear end of the front apron reinforcement, and overlaps a front part of the rear apron reinforcement in the front-rear direction in a side view of a vehicle.

3. The front vehicle-body structure according to claim 2, wherein the apron reinforcement includes, at an upper part, an apron reinforcement upper wall extending substantially horizontally, and the reinforcing member includes an upper flange that extends rearward from an upper end and is connected to the apron reinforcement upper wall, and a lower flange that extends rearward from a lower end and is connected to the bracing reinforcement bottom wall.

4. The front vehicle-body structure according to claim 3, wherein the reinforcing member supports a rear end of the suspension housing.

5. The front vehicle-body structure according to claim 1, wherein the reinforcing member is a first reinforcing member, inside the closed section of the apron reinforcement, a second reinforcing member that partitions the closed section in the front-rear direction is further provided on a rear side of the first reinforcing member, the bracing reinforcement includes, at a top thereof, a bracing reinforcement top wall facing the bracing reinforcement bottom wall from an upper rear side, the apron reinforcement includes, at a bottom thereof, an apron reinforcement bottom wall extending substantially horizontally, and the bracing reinforcement top wall is vertically continuous with a lower end of the second reinforcing member via the apron reinforcement bottom wall.

6. The front vehicle-body structure according to claim 2, wherein the reinforcing member is a first reinforcing member, inside the closed section of the apron reinforcement, a second reinforcing member that partitions the closed section in the front-rear direction is further provided on a rear side of the first reinforcing member, the bracing reinforcement includes, at a top thereof, a bracing reinforcement top wall facing the bracing reinforcement bottom wall from an upper rear side, the apron reinforcement includes, at a bottom thereof, an apron reinforcement bottom wall extending substantially horizontally, and the bracing reinforcement top wall is vertically continuous with a lower end of the second reinforcing member via the apron reinforcement bottom wall.

7. The front vehicle-body structure according to claim 3, wherein the reinforcing member is a first reinforcing member, inside the closed section of the apron reinforcement, a second reinforcing member that partitions the closed section in the front-rear direction is further provided on a rear side of the first reinforcing member, the bracing reinforcement includes, at a top thereof, a bracing reinforcement top wall facing the bracing reinforcement bottom wall from an upper rear side, the apron reinforcement includes, at a bottom thereof, an apron reinforcement bottom wall extending substantially horizontally, and the bracing reinforcement top wall is vertically continuous with a lower end of the second reinforcing member via the apron reinforcement bottom wall.

8. The front vehicle-body structure according to claim 4, wherein the reinforcing member is a first reinforcing member, inside the closed section of the apron reinforcement, a second reinforcing member that partitions the closed section in the front-rear direction is further provided on a rear side of the first reinforcing member, the bracing reinforcement includes, at a top thereof, a bracing reinforcement top wall facing the bracing reinforcement bottom wall from an upper rear side, the apron reinforcement includes, at a bottom thereof, an apron reinforcement bottom wall extending substantially horizontally, and the bracing reinforcement top wall is vertically continuous with a lower end of the second reinforcing member via the apron reinforcement bottom wall.

* * * * *